(12) United States Patent
Biteau et al.

(10) Patent No.: US 7,157,518 B2
(45) Date of Patent: Jan. 2, 2007

(54) METHOD FOR PREPARING AN ORGANO-SILICON SOL AND MATERIALS OBTAINED FROM SUCH A SOL

(75) Inventors: John Biteau, Saint-Maur-des-Fossés (FR); Jean-Pierre Boilot, Meudon la Fôret (FR); Frédéric Chaput, Massy (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 10/610,015

(22) Filed: Jun. 30, 2003

(65) Prior Publication Data
US 2004/0059052 A1    Mar. 25, 2004

Related U.S. Application Data

(60) Division of application No. 09/882,422, filed on Jun. 15, 2001, now Pat. No. 6,624,237, which is a continuation of application No. PCT/FR99/03058, filed on Dec. 8, 1999.

(30) Foreign Application Priority Data
Dec. 15, 1998  (FR) .................................. 98 15825

(51) Int. Cl.
*C08L 83/04* (2006.01)

(52) U.S. Cl. ........................ 524/588; 528/12; 528/491; 528/494; 528/501; 549/215

(58) Field of Classification Search ................. 528/12, 528/491, 494, 501; 549/215; 524/588
See application file for complete search history.

(56) References Cited

U.S. PATENT DOCUMENTS 5,096,942 A * 3/1992 Long et al. .................. 523/212

FOREIGN PATENT DOCUMENTS

EP        0089279        9/1983

(Continued)

OTHER PUBLICATIONS

Hancock et al., Pharmaceutical Research, 11(4), 471-477 (1994).*

(Continued)

*Primary Examiner*—Kuo-Liang Peng
(74) *Attorney, Agent, or Firm*—Fulbright & Jaworski L.L.P.

(57) ABSTRACT

The method consists in hydrolysing an initial volume Vse of a precursor material comprising at least one polyalkoxysilane with a quantity of water such that $$\frac{x\,H_2O}{x\,Si} \geq 10, \text{ and}$$

where $x\,H_2O$ and $x\,Si$ represent the number of moles of $H_2O$ and Si present, respectively, the concentration of the hydrolysate up to a volume substantially equal to the initial volume Vsi, leaving the concentrated hydrolysate until segregation into an aqueous phase and an organo-silicon phase, and recovery of the organo-silicon phase. A product can be obtained which comprises an organo-silicon sol comprising silicon species $T^1$, $T^2$, and $T^3$, wherein the molar fraction of species $T^2$ is equal or greater than 50%, comprising a condensation rate equal to or greater than 0.65, and further defined as lacking water, as determined by analyzing a sample of said organo-silicon sol by $^1H$ NMR and observing the absence of peak corresponding to water.

15 Claims, 1 Drawing Sheet

FOREIGN PATENT DOCUMENTS

| | | |
|---|---|---|
| EP | 0614957 | 9/1994 |
| FR | 2493301 | 5/1982 |
| JP | 03 006276 | 1/1991 |
| JP | 04 044838 | 2/1992 |
| JP | 05 163463 | 6/1993 |
| JP | 05 306339 | 11/1993 |
| WO | WO 94/25406 | 11/1994 |

OTHER PUBLICATIONS

Darracq et al., "Novel photorefractive sol-gel materials," *Optical Materials*, 9:265-270, 1998.

Vainrub et al., "Sol-gel polymerization in alkoxysilanes: $^{29}$Si NMR study and simulation of chemical kinetics," *Materials Science & Engineering B*, B37:197-200, 1996.

Xue et al., "Chemical reactions of an epoxy-functional silane in aqueous solutions," *Rubber Chem Technol*, 64(2):162-171, 1991.

International Search Report Dated Jan. 26, 2000.

* cited by examiner

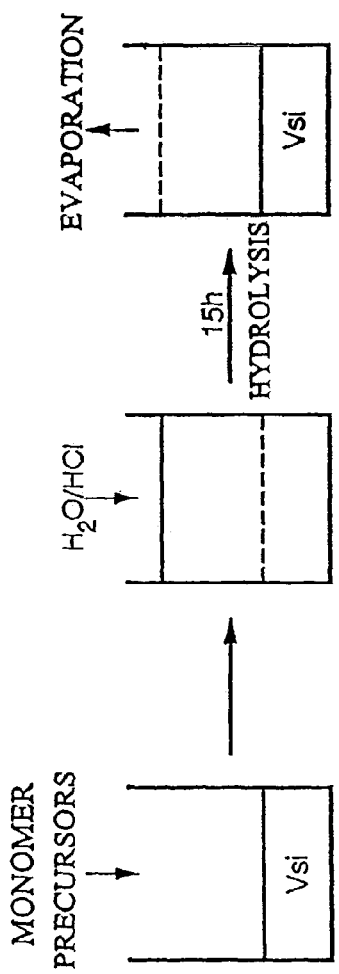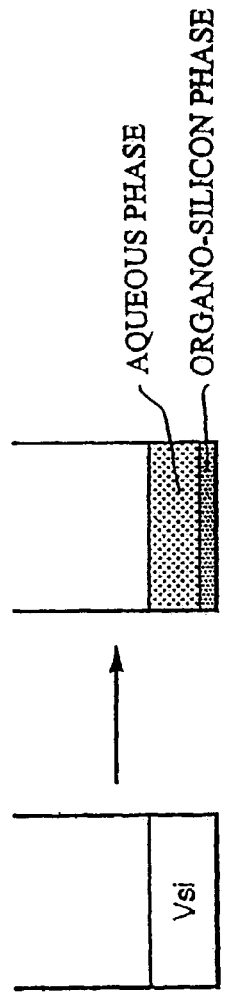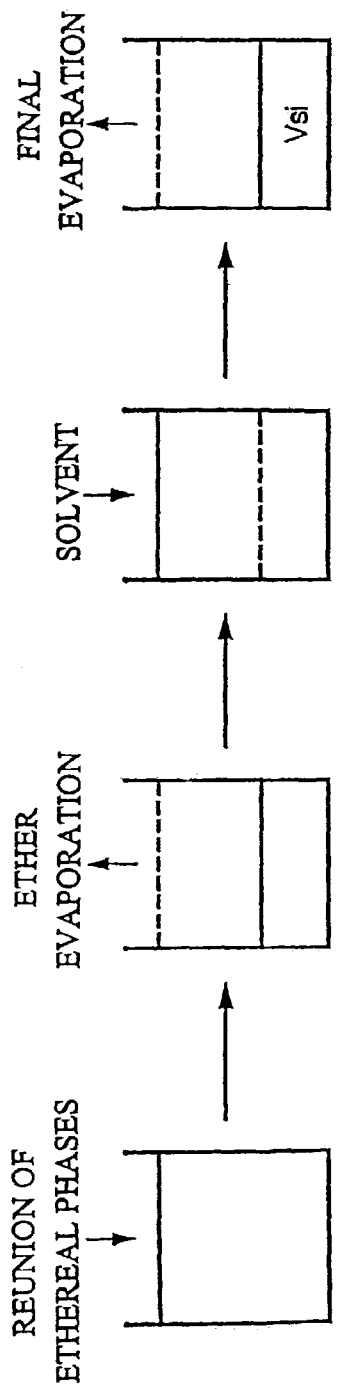

METHOD FOR PREPARING AN ORGANO-SILICON SOL AND MATERIALS OBTAINED FROM SUCH A SOL

This Application is a divisional of U.S. application Ser. No. 09/882,422 filed Jun. 15, 2001, now issued as U.S. Pat. No. 6,624,237, which is a continuation of prior international Application No. PCT/FR99/03058 filed on Dec. 8, 1999, which claims priority to French Application No. 98 15825 filed Dec. 15, 1998.

BACKGROUND OF THE INVENTION

This invention relates generally to a method for preparing a hydrolysate of organoalkoxysilanes, in particular a hydrolysate in which the hydrophobic organic and low polar molecules exhibit excellent solubility, as well as the use of this organoalkoxysilane hydrolysate for obtaining transparent films or substrates, including or not organic molecules and/or inorganic particles, and the applications of these substrates and films in the field of optics, in particular ophthalmic optics.

Below in this request, the organoalkoxysilane hydrolysate will be called organo-silicon sol.

Generally, preparing organo-silicon sols is difficult.

The final properties of the sol and consequently of the derived substrates and/or transparent films depend to a large extent on the sol preparation method, even if the final sol drying/condensation step for obtaining the substrate and/or the film also plays a significant role.

Such sols should exhibit stability properties, i.e. after its preparation, the essential characteristics of the sol (condensation rate, proportion of the various hydrolysed and/or precondensed species, viscosity) do not change or very little with time.

Besides, in the optical field, it has also be sought to obtain organo-silicon sols capable of solubilising low polar, hydrophobic organic additives, in particular for obtaining films of a few microns in thickness.

This latter property of the sol must be preserved during the drying step, i.e. when eliminating solubilisation solvents and during final condensation of the species derived from hydrolysis, so that the additive does not precipitate during this step.

Among organic additives that are particularly interesting in the optical field, photochromic compounds can be mentioned.

The document FR-A-2 704 851 describes a method for preparing an organo-silicon sol in which the following operations are conducted: complete hydrolysis of a solution containing one or several organo-alkoxysilanes in an organic solvent or mixtures of organic solvents using an acid aqueous solution with a pH equal to or smaller than 3, elimination of the organic solvent(s) and of the residual alcohols and concentration of the solution by distillation for obtaining a sol.

However, the method of the patent FR-A-2 704 851 leads to sols certain properties of which strongly vary with time, in particular the condensation rate and the composition of the species present in the sol.

Moreover, it is difficult to solubilise in the sols of patent FR-A-2 704 851 low polar, hydrophobic organic additives and in particular photochromic compounds.

The article entitled "Organosiloxane Resin with High Silanol Content" Furuya et al.—Silicones in Coatings II—A Technology Forum Exploring the Versatility of Silicone—24–26 Mar. 1998—Florida—USA—Conference Papers", describes the synthesis of an organosiloxane resin by hydrolysing trialkoxysilanes with acidified water in the absence of an organic solvent. The alcohol produced during hydrolysis is eliminated by heating or under reduced pressure in order to precipitate a viscous product that is a siloxane resin with high silanol content.

Although the method of the article leads to more stable sols, it would be nevertheless desirable to obtain sols with increased stability as well as better solubility of additives such as photochromic compounds.

SUMMARY OF THE INVENTION

It has been found according to the invention that by hydrolysing an organo-silicon precursor with large water excess, then by concentrating the hydrolysate and by leaving it until segregation into an aqueous phase and an organo-silicon phase, and by dispersing again the collected organo-silicon phase having a very low water content, and possibly dried, in a hydrophobic solvent, a very stable sol could be obtained, in which it was possible to solubilise additives such as photochromic compounds.

According to the invention, the method for preparing an organo-silicon sol comprises:

a) hydrolysis of an initial volume $V_{si}$ of a precursor material containing at least an organo-silicon monomer precursor with formula:

$$R^1_n Si(OR^2)_{4-n} \qquad (I)$$

in which
the radicals $R^1$, identical or different, represent an alkyl group, an aryl group, a vinyl group or H,
the radicals $R^2$, identical or different, represent H or an alkyl group, and
n is an integer varying from 1 to 2,
n=2 if $R^1$ represents H, with a water quantity such as $$\frac{x\ H_2O}{x\ Si} \geq 10$$

and, with a possible quantity of an organic solvent such that $$0 \leq \frac{x\ \text{Solvent}}{x\ Si} \leq 8$$

where x $H_2O$, x Si and x Solvent represent, respectively, the number of moles of $H_2O$, Si and Solvent present.

and under the condition that when $$\frac{x\ H_2O}{x\ Si} = 10, x\ \text{Solvent} = 0,$$

to obtain a hydrolysate of the precursor material;

b) concentration of the hydrolysate down to a volume substantially equal to the initial volume $V_{si}$;

c) leaving the concentrated hydrolysate until a distinct aqueous phase and a distinct organo-silicon phase are obtained, and d) separation and collection of the organo-silicon phase.

The recovered organo-silicon phase is preferably subjected to a drying step (e), either (1) by addition of a solvent with a boiling point above 100° C. at atmospheric pressure or a solvent forming an azeotrope element with water (for example 2-butanone Teb≈79.6° C.) and evaporation of the solvent, or (2) by extraction with a hydrophobic solvent.

Using a solvent with a boiling point greater than 100° C. calling for heating at relatively high temperature in order to eliminate the solvent, has the shortcoming of causing the soil (condensation rate) to evolve.

Azeotropic distillation, although resorting to lower temperatures, calls for repeated distillations and the quantity of water remaining in the sol remains relatively important.

It is therefore preferable to dry by extraction with a hydrophobic solvent exhibiting a boiling point equal to or smaller than 80° C. Preferably, ethyl acetate or diethyl ether is used.

The recommended drying method is diethyl ether extraction that, however, implies replacing ether with another solvent.

Indeed, diethyl ether is not a solvent appropriate for usage of the sol. The sol is polar and its solubility in diethyl ether does not enable to achieve the volume $V_{si}$ by evaporation. Moreover, this volatile solvent does not enable the shaping of materials.

Diethyl ether can be replaced easily with any solvent with higher boiling point and in which organo-silicon species are soluble.

Diethyl ether is therefore evaporated partially under reduced pressure (down to the solubility limit of the sol), the replacement solvent is added in excess (for example 2 $V_{si}$), then the evaporation is carried on until the volume $V_{si}$ is obtained.

This latter operation is conducted twice in order to evaporate all the diethyl ether present in the sol.

The solvents used are, for instance, acetone, 2-butanone, tetrahydrofuran.

When the diethyl ether extraction step is used both the obtained silicon organic phase and aqueous phase can be extracted with ether and both ethereal phases are gathered before replacing ether with another solvent.

Hydrolysis water is an aqueous solution with a pH ranging generally between 3 and 10, and preferably acid. The hydrolysis solution can be acidified by an inorganic acid such as HCl, HNO$_3$ or H$_2$SO$_4$ or an organic acid such as acetic acid.

As stated above, the quantity of aqueous solution used for hydrolysis is such that the following ratio $$\frac{x\ H_2O}{x\ Si} \geq 10$$

preferably $$10 \leq \frac{x\ H_2O}{x\ Si} \leq 20$$

The hydrolysis medium may comprise an organic solvent selected preferably among THF (tetrahydrofuran), inferior alcohols such as ethanol or inferior ketones such as acetone.

The hydrolysable precursor material comprises at least one organo-silicon monomer precursor with the following formula:

$$R^1{}_n Si(OR^2)_{4-n} \quad (I)$$

where $R^1$, $R^2$ and n are such as defined previously.

$R^1$ represents preferably a methyl, ethyl, phenyl radical or a phenyl radical substituted with preferably non-polar groups (for example alkyl groups such as methyl, ethyl, propyl, or phenyl groups or still a vinyl radical.

$R^2$ represents preferably H or a $C_1$ to $C_7$ alkyl group, for example a methyl, ethyl or propyl radical.

Preferably, n is equal to 2 to 1, and ideally n is equal to 1.

Among the particularly preferred organo-silicon precursors with formula (I), the following can be mentioned: methyltrimethoxysilane (MTMOS), methyltriethoxysilane (MTEOS), ethyltriethoxysilane (ETEOS), dimethyldimethoxysilane (DMDMOS), dimethyldiethoxysilane (DMDEOS), diethoxymethylsilane (HMDEOS), phenyltriethoxysilane (PTEOS) and vinyltriethoxysilane (VTEOS).

Apart from a monomer precursor or a mixture of monomer precursors with formula (I), the precursor material may comprises at least one monomer precursor selected among the epoxytrialcoxysilane monomers. Among these epoxytrialcoxysilane monomers, silanes with epoxy group of the following formula can be mentioned:

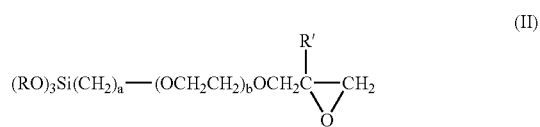

in which:

R is a $C_1$–$C_6$, preferably $CH_3$ or $C_2H_5$, alkyl group,

R' is a methyl group or a hydrogen atom, a is an integer from 1 to 6, and b is equal to 0, 1 or 2.

The preferred epoxysilanes are γ-glycidoxypropyltrimethoxysilane or γ-glycidoxypropyltriethoxysilane.

The particularly preferred monomer is γ-glycidoxypropyltrimethoxysilane (GLYMO).

Generally, the resting time to obtain the phase separation (segregation) may vary from 1 to several days up to several weeks, for example 4 to 6 weeks.

To obtain a phase separation (segregation) during the resting step (c), when the precursor material comprises a monomer precursor of formula (I) and an epoxytrialkoxysilane monomer precursor, the proportion in molar percentage, of epoxytrialkoxysilane monomer precursors in relation to the monomer precursors of formula (I), is generally in the order of 50% or less according to the monomers used. Preferably, the molar proportion of epoxytrialkoxysilane monomer precursors with respect to the monomers of formula (I) will be approx. 25% or less.

The elimination step (b) of water and organic solvents can be conducted by any appropriate means, but preferably by application of a primary vacuum.

According to the application contemplated for the organo-silicon sols according to the invention, additives can be introduced to modify the mechanical (elasticity, rigidity, hardness) or optical (index, colour) properties of the endproduct, for example by addition of an additive as an organic solution compatible with the organic medium of the sol, then concentration of the sol.

The additives used can be colouring agents such as laser colouring agents, enzymes, semiconductor or magnetic nanoparticles or still photochromic compounds.

The structure of the sols according to the invention, exhibiting high rate of units $T^2$, proves particularly suited to promote spectrokinetic performances of the organic photochromic compounds.

The photochromic compounds used preferably are spirooxazines, chromens or fulgides.

There can also be incorporated in the organo-silicon phase or sol according to the invention a predetermined quantity of colloidal silica, preferably colloidal silica in an organic solvent whose pH ranges between 3.5 and 6, such as the mixed colloidal silica $SiO_2/Al_2O_3$ (pH 5) in a quantity representing up to 60% by weight of the sol.

The colloidal silica is generally introduced in the final sol preparation step, after recovery of the organo-silicon phase.

The organo-silicon sols according to the invention are characterised, among other things, by a stable condensation rate (Tc), equal to or greater than 0.65 and the presence of a molar content of silicon units $T^2$ greater than or equal to 50%, and preferably greater than or equal to 60%.

Preferably, the organo-silicon sols according to the invention are deprived of water, as determined by the absence of peaks corresponding to water by $^1H$ NMR.

The invention also relates to organo-silicon sols with the previous features and including at least one solubilised photochromic compound.

It has been determined that the solubility of the additives, in particular of the photochromic compounds, was vastly increased with the organo-silicon sols according to the invention.

Besides, the organo-silicon sols according to the invention are very stable.

The organo-silicon sols according to the invention can then be shaped and condensed into massive materials such as xerogels or into thin films.

The sols according to the invention are particularly suited to the realisation of anti-abrasion hard films or anti-reflection films in the field of ophthalmic optics, and especially for spectacle glasses.

The following examples illustrate the present invention.

In the examples, unless other stated, all the percentages and parts are expressed in weight.

BRIEF DESCRIPTION OF THE DRAWINGS

FIGS. 1A–C: FIGS. 1A–C represent, in diagram form, the various steps for preparing an organo-silicon sol according to the invention.

DETAILED DESCRIPTION OF THE INVENTION

Example of Preparation of an Organo-silicon Sol According to the Invention

An example for preparing an organo-silicon sol will now be described while referring to FIGS. 1a to 1c that represent diagrammatically the various steps of the method according to the invention.

Hydrolysis of the Precursors

To a molar equivalent of methyltriethoxysilane (MTEOS) that, as shown on FIG. 1a, represents an initial volume $V_{si}$, is added 20 water molar equivalents whose pH has been lowered to 3.8 by addition of HCl.

The mixture is stirred for 15 hours.

Initially, the mixture is not miscible. When the progress of the hydrolysis is sufficient (2 hours), the ethanol formed enables miscibility.

The solution is then limpid.

Concentration of the Sol

After hydrolysis, the solvents are evaporated under reduced pressure (preferably a primary vacuum) until the initial volume $V_{si}$ is obtained.

Segregation

The sol thus obtained is stored at 4° C.

After 24 hours, the MTEOS sol is cloudy and segregation starts.

After 5 days at 4° C., maximum segregation is achieved and as shown on FIG. 1b, a very viscous organo-silicon phase and an aqueous phase floating on the surface are obtained.

The composition of both phases has been obtained by $^1H$ NMR.

The relative proportions of each specie are summed up in the table below (molar proportions).

| Species | Silicon phase | Aqueous phase |
| --- | --- | --- |
| $CH_3$—Si | 46% | 0.6% |
| $CH_3CH_2OH$ | 4% | 1.4% |
| $H_2O$ | 50% | 98% |

Condensation rate (Tc) of the silicon species in the silicon phase 0.78

Condensation rate (Tc) of the silicon species in the aqueous phase 0.66

At that stage, the silicon phase comprises 50% water.

This phase is collected, then treated with diethyl ether.

The water fraction trapped previously in the silicon phase is clearly visible and can be separated without any difficulty.

The spectrum RMN $^1H$ of the silicon phase dispersed again in the diethyl ether does not show any peaks corresponding to water.

Replacing the Diethyl Ether with Another Solvent

Before using the sol, as stated previously, diethyl ether should be replaced with another solvent, for example ethanol.

This replacement can take place easily, as shown on FIG. 1c, by evaporation of the diethyl ether, preferably under reduced pressure, addition of an appropriate solvent and concentration until a volume close to the initial volume $V_{si}$ is obtained.

The final sol obtained shows the distribution of the following silicon species (molar composition):

$T^1$=3.9% $T^2$=54.7% $T^3$=41.4%

The condensation rate Tc of the silicon species is 0.79.

Stability Test

The sol is kept for 18 months at 4° C. temperature.

The composition of the sol is then analysed again.

The distribution of the silicon species (molar composition) is:

$T^1$=2.6% $T^2$=53.4% $T^3$=44%

The condensation rate Tc of the silicon species is 0.80.

The very high stability of the sols according to the invention can be observed.

Shaping and Condensing the Materials

Massive Materials:

The sol is poured into a polypropylene mould.

This mould is then covered with an aluminum sheet pierced with two 0.5-diameter holes.

The sample is then placed in a stove.

The temperature of the stove is typically 60° C.

At that temperature, the sol has gellified and begins to shrink after 16 hours.

After four days, the xerogel is brought out from the stove.

The volume of the samples thus prepared is a few cubic centimetres. They can be polished for an optical application.

Thin Films:

The films are deposited by centrifugation.

The viscosity of the sol is adjusted after introducing of the organic additive (if present). The volume of the sol is brought to a level smaller than $V_{si}$ for a viscous sol and thick films, and it can be diluted for reducing viscosity and obtaining thinner films.

The viscosity of the sol (silicon concentration) and the rotation speed of the substrate enable to vary the thickness of the films.

EXAMPLES

[Si]=7 moles/l-substrate: 1300 rpm
thickness of the film obtained: 7 μm
[Si]=0.2 moles/l-substrate: 1000 rpm
thickness of the film obtained: 85 nm
The sols are deposited on different substrates: mineral glass, gold-coated mineral glass, double face polished crystalline silicium.

The films are then condensed-at different temperatures, from 70 to 130° C.

COMPARATIVE EXAMPLE

A sol is prepared according to the method described in the patent FR 2 704 851. 0,1 mole MTEOS (methyltriethoxysilane) is mixed with 0.3 mole water (i.e. 5.4 cm$^3$) whose pH is adjusted to 2.5 by adding hydrochloric acid, and 0.3 mole ethanol (i.e. 17.5 cm$^3$).

The mixture is stirred for a few hours, then it is distilled under primary vacuum ($10^{-3}$ mm Hg or $10^{-3}$ torr) until a volume identical with that of the initial MTEOS is obtained. Thus, we obtain a syrupy sol showing a concentration of 5.02 moles/l of silicon atoms.

The final pH of this sol ranges between 3 and 4.

This sol, obtained by stoichiometric hydrolysis, has a concentration rate Tc in the order of 0.58 smaller than that of the sol according to the invention.

The silicon species (units) present in the medium are as follows:

$T^1$=34.9% $T^2$=57.4% $T^3$=7.7% (molar compositions)

The sol is stored at 4° C. for 11 months.

New measurements show that the condensation rate Tc has increased from 0.58 to 0.90.

The silicon species present are:

$T^1$=0.6% $T^2$=29.5% $T^3$=69.9%

Moreover, particles have precipitated, which calls for filtration before using the sol.

Mechanical Characterisation

The results obtained relate to 5 to 7-μm thick films.

These measurements consist in indenting the several micron-thick layers over a few hundred nanometers in depth.

Nano-indentation enables to obtain characteristic values of the mechanical behaviour of the films.

Er (reduced Young modulus) and H (plastic hardness) are measured.

| Solubilised element | Film (hardening conditions) | Er | H (MPa) |
|---|---|---|---|
| Ex. 1 | (1 h 30 - 130° C.) | 2.35 | 180 |
|  | (3 days - 130° C.) | 4.08 | 650 |
| Ex. 1 + SiO$_2$ 55% of the dry extract of the sol | (OSCALL 1122 A8 Shokubai) |  |  |
|  | (1 h 30 - 130° C.) | 6.49 | 450 |
|  | (3 days - 130° C.) | 9.46 | 1200 |
| Comparative ex. | 100° C. | 3.1 | 110–140 |

Incorporation of Additives

The solubility of a few molecules has been compared in two types of MTEOS sols.

| | Sol, comparative example | | Sol, example 1 | |
|---|---|---|---|---|
| Molecules | Molar ratio | % dry extract mass | Molar ratio | % dry extract mass |
| Photochromic compounds Films | | | | |
| SO1 | 10/1000 | (5.8%) | 50/1000 | (29%) |
| SO6 | 1.8/1000 precipitation in sol | (5.8%) | 6/1000 precipitation during drying | (4.2%) |
| SO4 | | | 2/1000 | (1.2%) |
| DTE 1 | 2/1000 precipitation in sol | (1.7%) | 10/1000 | (8.7%) |
| Other molecules Xerogel | | | | |
| Ruthenium phtalocyanine | 3.5 × 10$^{-4}$ Precipitation | (0.40%) | 3.5 × 10$^{-4}$ | (0.40%) |
| Tin naphtaocyanine | 1.3 × 10$^{-4}$ | (0.32%) | 10$^{-3}$ | (2.1%) |
| Spin-transition iron complex | Insoluble | | 2 × 10$^{-4}$ | (0.21%) |

Regardless of the molecules, the sol according to the invention provides far better solubility.

The sols of the invention enable to introduce molecules that had never been incorporated to that type of sol so far.

Additives Used (Signification of the Abbreviations)

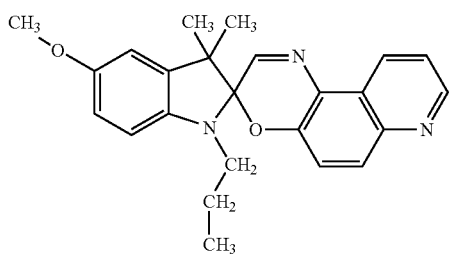
SO1

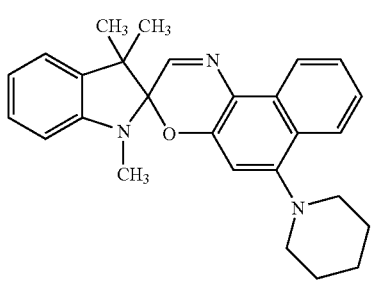
SO4

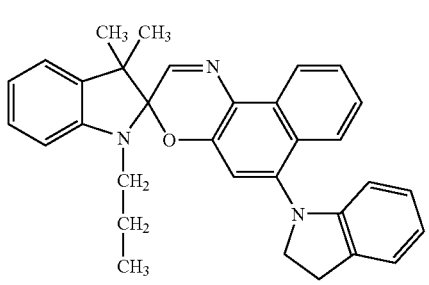
SO6

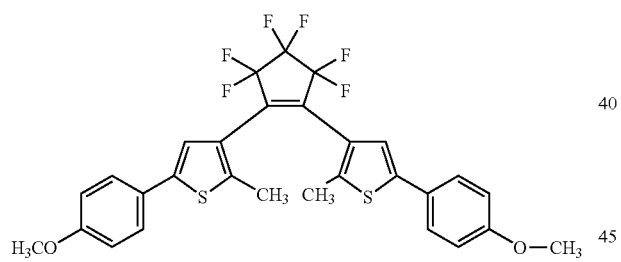
DTE1

Determining the Condensation Rate

The condensation rate of the phases is obtained by RMN $^{29}$Si. This technique enables to differentiate all the silicon atoms from various environments.

In the case of a totally hydrolysed sol, the species present in the medium are as follows:

|  | Denomination |
| --- | --- |
| $R^1Si(OH)_3$ | $T^0$ |
| $R^1Si(OH)_2$—OSi | $T^1$ |
| $R^1Si(OH)(OSi)_2$ | $T^2$ |
| $R^1Si(OSi)_3$ | $T^3$ |

The condensation rate Tc is the ratio of the number of formed siloxanes to the number of maximum siloxanes.

$$Tc = (1kT^1 + 2kT^2 + 3kT^3)/3$$

where $kT^1$, $kT^2$ and $kT^3$ are respectively the molar fractions in species $T^1$, $T^2$ and $T^3$.

Examples of Sols Containing an Epoxytrialkoxysilane Monomer

Proceeding as previously, the following sols have been prepared:

|  | Monomer precursors % molar | | | | Segregation conditions |
| --- | --- | --- | --- | --- | --- |
|  | ETEOS | DMDMOS | MTMOS | GLYMO |  |
| Sol 1 | 100 | — | — | — | 4 weeks at 25° C. and 1 week at 4° C. |
| Sol 2 | — | 25 | — | 75 | No segregation |
| Sol 3 | — | 42 | — | 58 | 3.5 days at 25° C. and half a day at 5° C. |
| Sol 4 | — | 50 | — | 50 | 3.5 days at 25° C. and half a day at 5° C. |
| Sol 5 | — | 75 | — | 25 | 3.5 days at 25° C. and half a day at 5° C. |
| Sol 6 | — | — | 25 | 75 | No segregation |
| Sol 7 | — | — | 50 | 50 | No segregation |
| Sol 8 | — | — | 75 | 25 | 1 week at 4° C. |

The invention claimed is:

1. An organo-silicon sol comprising silicon species $T^1$, $T^2$ and $T^3$ having a condensation rate (Tc) equal to or greater than 0.65, wherein the molar fraction of species $T^2$ is equal to or greater than 50%, wherein the organo-silicon sol is further defined as lacking water as determined by $^1$H NMR, and wherein the organo-silicon sol comprises at least one solubilized photochromic compound.

2. The organo-silicon sol of claim 1, wherein the molar fraction of species $T^2$ is equal to or greater than 60%.

3. The organo-silicon sol of claim 1, further defined as being obtained by a method comprising:

a) preparing a hydrolysate by hydrolysis of an initial volume $V_{si}$ of a precursor material comprising at least one organo-silicon monomer precursor with formula:

$$R^1{}_nSi(OR^2)_{4-n} \quad (I)$$

in which the radicals $R^1$, identical or different, represent an alkyl group, an aryl group, a vinyl group or H, the radicals $R^2$, identical or different, represent H or an alkyl group, and n is an integer varying from 1 to 2, and n=2 if $R^1$ represents H, in water, wherein $$\frac{xH_2O}{xSi} \geq 10, \text{ and}$$

x $H_2O$ and x Si represent, respectively, the number of moles of water and of organo-silicon monomer present, to obtain a hydrolysate of the precursor material;

b) allowing the hydrolysate to form a distinct aqueous phase and a distinct organo-silicon phase; and c) recovering the organo-silicon phase.

4. The organo-silicon sol of claim 3, wherein:

the hydrolysate is prepared in the quantity of an organic solvent wherein $$0 \leq \frac{x\text{Solvent}}{xSi} \leq 8, \text{ and}$$

x Solvent represents the number of moles of Solvent present; when $$\frac{xH_2O}{xSi} = 10, x\text{Solvent} = 0; \text{ and}$$

the method further comprises concentration of the hydrolysate to a volume substantially equal to the initial volume $V_{si}$.

5. The organo-silicon sol of claim 3, wherein:
   $R^1$ is a methyl, ethyl, phenyl, substituted phenyl radical, or a vinyl radical;
   $R^2$ represents a $C_1$ to $C_7$ alkyl radical; and
   n is 1 or 2.

6. The organo-silicon sol of claim 3, wherein the quantity of water is such that $$10 \leq \frac{xH_2O}{xSi} \leq 20.$$

7. The organo-silicon sol of claim 3, wherein the precursor material further comprises at least one additional monomer precursor and the additional monomer precursor is further defined as an epoxytrialkoxysilane.

8. The organo-silicon sol of claim 3, wherein the hydrolysate has a pH of from 3 to 10.

9. The organo-silicon sol of claim 3, further comprising incorporation of a quantity of colloidal silica $SiO_2$ into the organo-silicon phase.

10. The organo-silicon sol of claim 3, further comprising drying the recovered organo-silicon phase.

11. A film comprising an organo-silicon sol of silicon species $T^1$, $T^2$ and $T^3$ having a condensation rate (Tc) equal to or greater than 0.65, wherein the molar fraction of species $T^2$ is equal to or greater than 50%, wherein the organo-silicon sol is further defined as lacking water as determined by $^1$H NMR, and wherein the organo-silicon sol comprises at least one solubilized photochromic compound.

12. The film of claim 11, wherein the molar fraction of species $T^2$ is equal to or greater than 60%.

13. A xerogel comprising an organo-silicon sol of silicon species $T^1$, $T^2$ and $T^3$ having a condensation rate (Tc) equal to or greater than 0.65, wherein the molar fraction of species $T^2$ is equal to or greater than 50%, wherein the organo silicon sol is further defined as lacking water as determined by $^1$H NMR, and wherein the organo-silicon sol comprises at least one solubilized photochromic compound.

14. The xerogel of claim 13, wherein the molar fraction of species $T^2$ is equal to or greater than 60%.

15. An organo-silicon sol comprising silicon species $T^1$, $T^2$ and $T^3$ having a condensation rate (Tc) equal to or greater than 0.65, wherein the molar fraction of species $T^2$ is equal to or greater than 50%, wherein the organo-silicon sol is further defined as lacking water as determined by $^1$H NMR, and wherein the organo-silicon sol is obtained by a method comprising:

a) preparing a hydrolysate by hydrolysis of an initial volume $V_{si}$ of a precursor material comprising at least one organo-silicon monomer precursor with formula:

$$R^1_n Si(OR^2)_{4-n} \qquad (I)$$

wherein
the radicals $R^1$, identical or different, represent an alkyl group, an aryl group, a vinyl group or H,
the radicals $R^2$, identical or different, represent H or an alkyl group, and
n is an integer varying from 1 to 2, and n=2 if $R^1$ represents H, in water, wherein $$\frac{x H_2O}{x Si} \geq 10, \text{ and}$$

x $H_2O$ and x Si represent, respectively, the number of moles of water and of organo-silicon monomer present, to obtain a hydrolysate of the precursor material, and wherein the precursor material further comprises at least one additional monomer precursor and the additional monomer precursor is further defined as an epoxytrialkoxysilane;

b) allowing the hydrolysate to form a distinct aqueous phase and a distinct organo-silicon phase; and c) recovering the organo-silicon phase.

* * * * *

UNITED STATES PATENT AND TRADEMARK OFFICE
CERTIFICATE OF CORRECTION

| | | |
|---|---|---|
| PATENT NO. | : 7,157,518 B2 | |
| APPLICATION NO. | : 10/610015 | |
| DATED | : January 2, 2007 | |
| INVENTOR(S) | : Biteau et al. | |

It is certified that error appears in the above-identified patent and that said Letters Patent is hereby corrected as shown below:

Title page, item [57], line 1, delete "Vse" and insert --Vsi-- therefor.

Signed and Sealed this

Tenth Day of April, 2007

JON W. DUDAS
*Director of the United States Patent and Trademark Office*